(12) United States Patent
Niimoto

(10) Patent No.: US 12,147,718 B2
(45) Date of Patent: Nov. 19, 2024

(54) SYSTEM AND METHOD FOR PROCESSING CONSUMABLE DELIVERY

(71) Applicant: CANON KABUSHIKI KAISHA, Tokyo (JP)

(72) Inventor: Keisuke Niimoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/352,968

(22) Filed: Jul. 14, 2023

(65) Prior Publication Data

US 2024/0020070 A1 Jan. 18, 2024

(30) Foreign Application Priority Data

Jul. 14, 2022 (JP) .................................. 2022-113307

(51) Int. Cl.
*G06F 3/12* (2006.01)

(52) U.S. Cl.
CPC .......... *G06F 3/1229* (2013.01); *G06F 3/1204* (2013.01); *G06F 3/1257* (2013.01); *G06F 3/1288* (2013.01)

(58) Field of Classification Search
None
See application file for complete search history.

(56) References Cited

U.S. PATENT DOCUMENTS

2009/0307231 A1* 12/2009 Matsunaga ............ G06Q 10/06
2020/0076978 A1* 3/2020 Kawahata .......... H04N 1/00925

FOREIGN PATENT DOCUMENTS

JP 2017054155 A 3/2017

\* cited by examiner

*Primary Examiner* — Lennin R Rodriguezgonzalez
(74) *Attorney, Agent, or Firm* — Canon U.S.A., Inc. IP Division

(57) ABSTRACT

A processing system includes a processing apparatus that performs processing by using consumables, and a server system that manages a service related to the consumables. The processing apparatus includes an acquisition unit that acquires first information about a consumption amount of a currently used consumable, a first updating unit that, based on the acquired first information, updates second information about a cumulative consumption amount of the consumable used by the processing apparatus stored in a first storage unit, and a transmission unit that transmits the updated second information to the server system. The server system includes a reception unit that receives the second information from the processing apparatus, and a first determination unit that determines whether to provide a service based on the second information received by the reception unit and the second information previously received from the processing apparatus which is stored in a second storage unit.

14 Claims, 15 Drawing Sheets

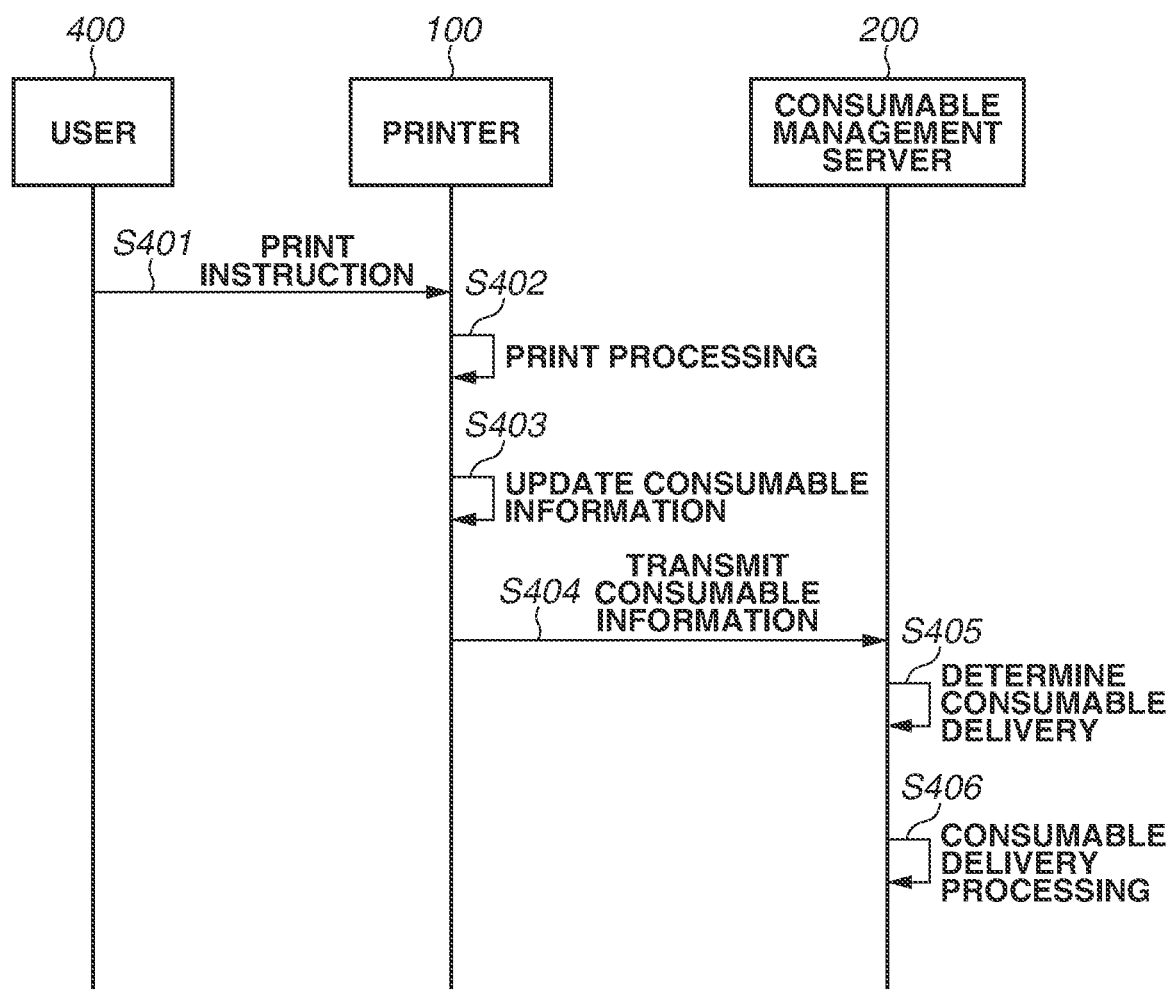

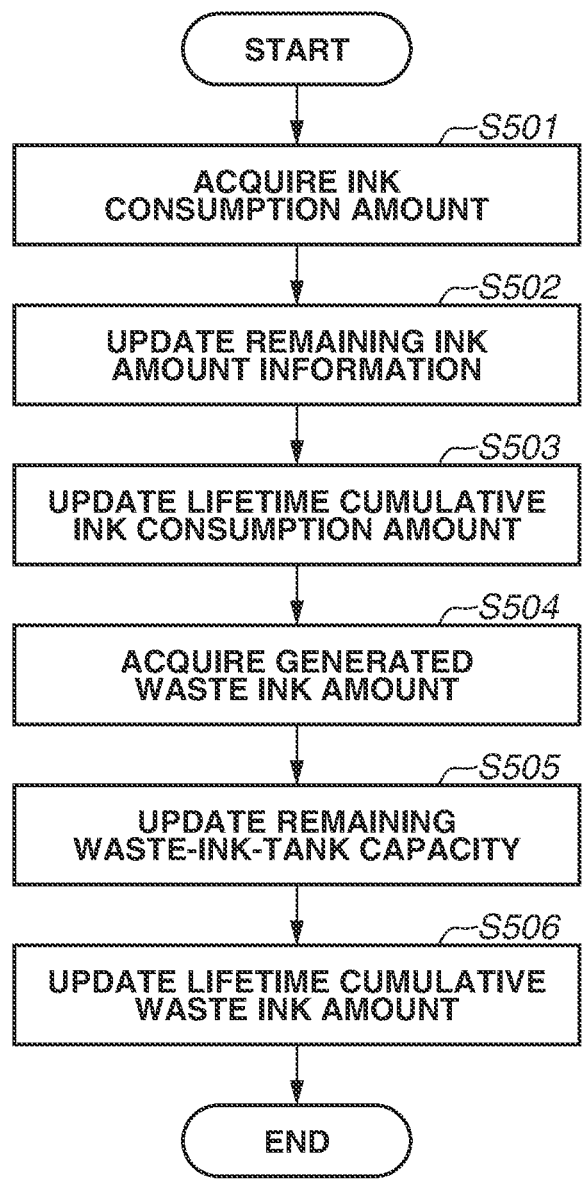

FIG.6A

| PRINTER INDIVIDUAL IDENTIFICATION INFORMATION | | | ABCDE1234 |
|---|---|---|---|
| [CONSUMABLE] INK CARTRIDGE | INDIVIDUAL IDENTIFICATION INFORMATION | CYAN | 000123456789 |
| | | MAGENTA | 100123456789 |
| | | YELLOW | 200123456789 |
| | | BLACK | 300123456789 |
| | REMAINING INK AMOUNT INFORMATION [%] | CYAN | 60% |
| | | MAGENTA | 40% |
| | | YELLOW | 90% |
| | | BLACK | 20% |
| [CONSUMABLE] WASTE INK TANK | INDIVIDUAL IDENTIFICATION INFORMATION | | 900123456789 |
| | REMAINING WASTE-INK-TANK CAPACITY INFORMATION [%] | | 30% |

FIG.6B

| PRINTER INDIVIDUAL IDENTIFICATION INFORMATION | | | ABCDE5678 |
|---|---|---|---|
| [CONSUMABLE] INK CARTRIDGE | LIFETIME CUMULATIVE INK CONSUMPTION AMOUNT [ng] | CYAN | 23456 |
| | | MAGENTA | 32567 |
| | | YELLOW | 12345 |
| | | BLACK | 43210 |
| [CONSUMABLE] WASTE INK TANK | LIFETIME CUMULATIVE WASTE INK AMOUNT [ng] | | 67890 |

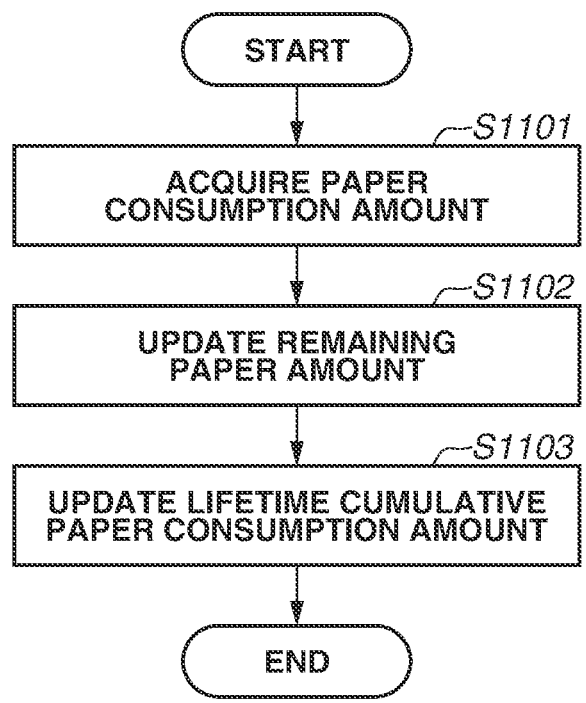

FIG.12A

| PRINTER INDIVIDUAL IDENTIFICATION INFORMATION | | ABCDE1234 |
|---|---|---|
| [CONSUMABLE] PAPER CASSETTE 1 | INDIVIDUAL IDENTIFICATION INFORMATION | 100123456789 |
| | REMAINING PAPER AMOUNT [NUMBER OF SHEETS] | 30 |
| [CONSUMABLE] PAPER CASSETTE 2 | INDIVIDUAL IDENTIFICATION INFORMATION | 110123456780 |
| | REMAINING PAPER AMOUNT [NUMBER OF SHEETS] | 90 |

FIG.12B

| PRINTER INDIVIDUAL IDENTIFICATION INFORMATION | | ABCDE1234 |
|---|---|---|
| [CONSUMABLE] PAPER CASSETTE 1 | LIFETIME CUMULATIVE PAPER CONSUMPTION [NUMBER OF SHEETS] | 350 |
| [CONSUMABLE] PAPER CASSETTE 2 | LIFETIME CUMULATIVE PAPER CONSUMPTION [NUMBER OF SHEETS] | 240 |

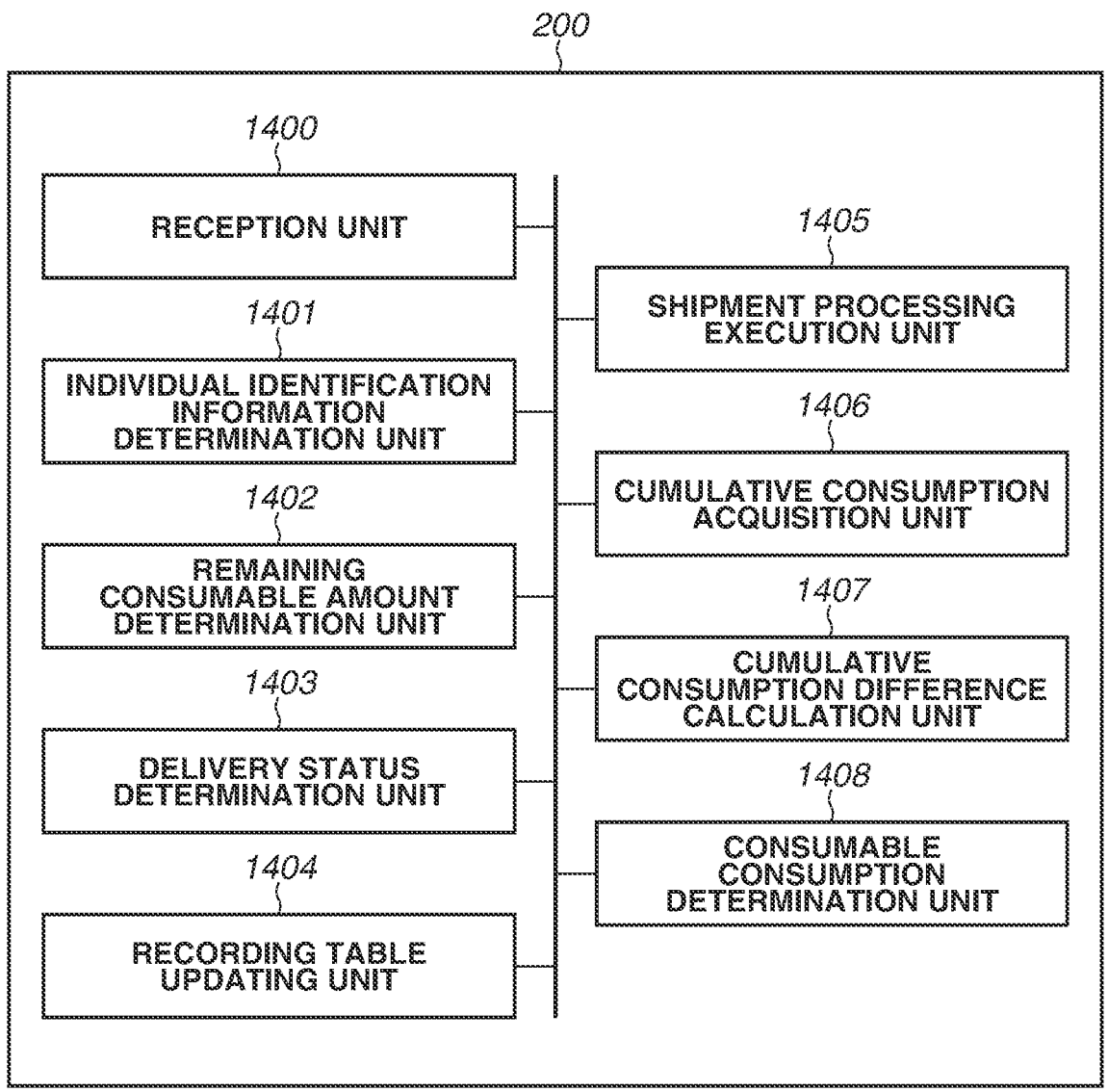

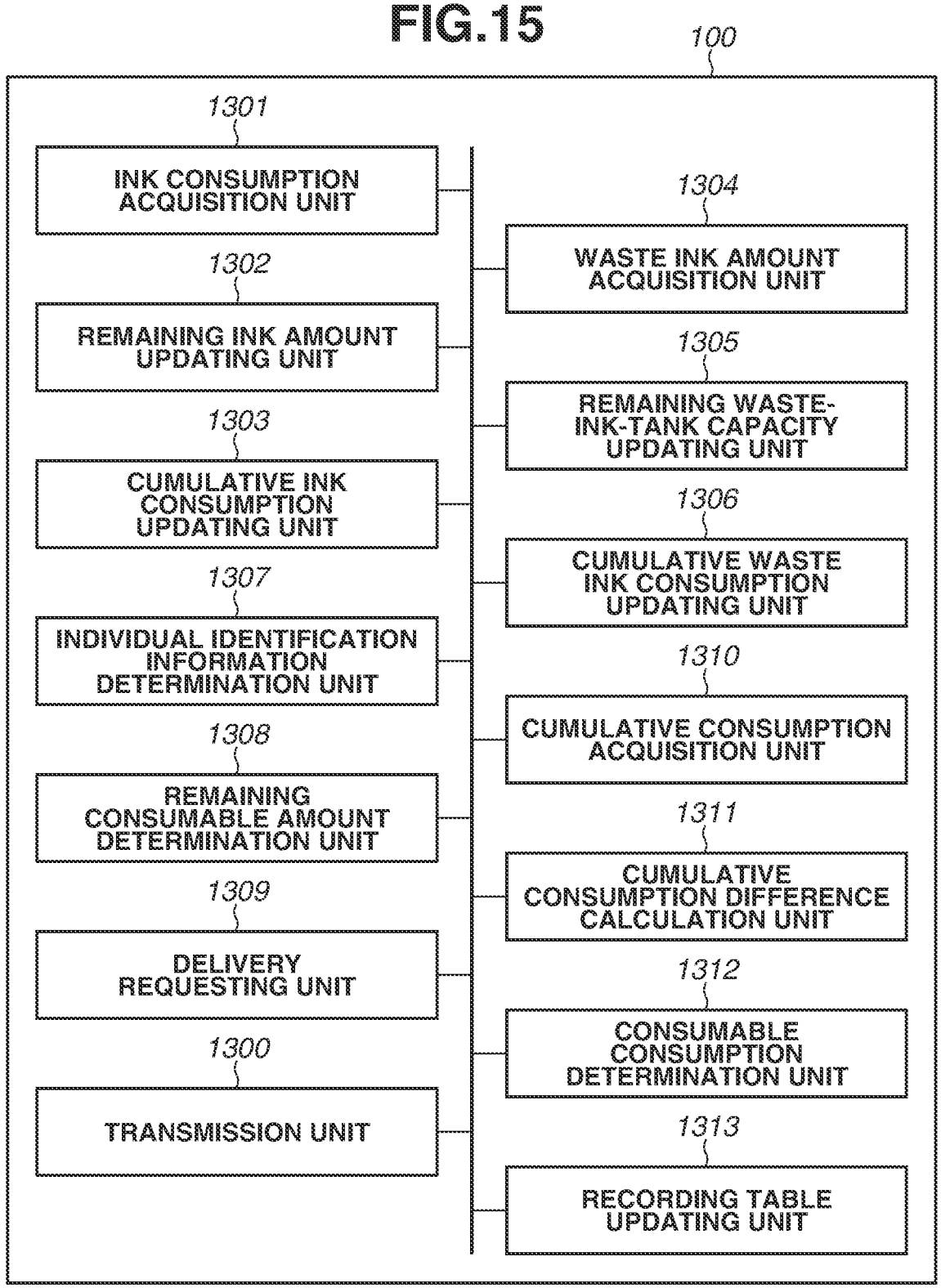

SYSTEM AND METHOD FOR PROCESSING CONSUMABLE DELIVERY

BACKGROUND

Field

The present disclosure relates to a processing system and a processing method in the processing system.

Description of the Related Art

There have been provided various services, such as failure analysis and accounting services, that are implemented by an image forming apparatus having a network function transmitting device information and a user's usage history to a management server. An example of such services includes a service for managing consumables such as ink via the management server and automatically delivering the consumables when the remaining amount decreases. In recent years, there have been widely used flat-rate services that provide consumables to users through introduction of a subscription agreement. In such a flat-rate service, an image forming apparatus transmits consumable information to a management server that manages the consumable information and determines delivery of a replacement.

To implement an automatic consumable delivery system, it is necessary to manage delivery of consumables to avoid duplicated delivery of a replacement. Assume an example case where an ink cartridge having a small ink remaining amount is attached to a plurality of apparatuses. If each of the plurality of apparatuses attached with the ink cartridge is set to be provided with a replacement, a plurality of replacement ink cartridges will be delivered for one ink cartridge (duplicated delivery). Japanese Patent Application Laid-Open No. 2017-54155 proposes a consumable management system in which a management server prevents the duplicated delivery based on individual identification information for each consumable. In the system discussed in Japanese Patent Application Laid-Open No. 2017-54155, an image forming apparatus monitors statuses of consumables and, upon determination that a new consumable is required, transmits a consumable delivery request together with individual identification information for the consumable to the management server. Upon reception of the consumable delivery request from the image forming apparatus, the management server determines whether the consumable has already been delivered based on the individual identification information. When the management server determines that the consumable has already been delivered, the management server does not deliver the consumable. When the management server determines that the consumable has not been delivered, the management server performs processing for delivering the consumable.

However, since the system discussed in Japanese Patent Application Laid-Open No. 2017-54155 requires the use of consumables having individual identification information, the system may not be able to manage consumables not having individual identification information.

SUMMARY

The present disclosure is directed to providing suitable services even for the consumables not having the individual identification information.

According to an aspect of the present disclosure, a processing system includes a processing apparatus configured to perform processing by using consumables, and a server system configured to manage a service related to the consumables, wherein the processing apparatus includes an acquisition unit configured to acquire first information about a consumption amount of a currently used consumable, a first updating unit configured to, based on the acquired first information, update second information about a cumulative consumption amount of the consumable used by the processing apparatus stored in a first storage unit, and a transmission unit configured to transmit the updated second information to the server system, and wherein the server system includes a reception unit configured to receive the second information from the processing apparatus, and a first determination unit configured to determine whether to provide a service based on the second information received by the reception unit and the second information previously received from the processing apparatus which is stored in a second storage unit.

Further features of the present disclosure will become apparent from the following description of exemplary embodiments with reference to the attached drawings.

BRIEF DESCRIPTION OF THE DRAWINGS

FIG. 4 is an overall sequence diagram illustrating an automatic consumable delivery service according to the first exemplary embodiment.

FIG. 5 is a flowchart illustrating processing for updating consumable information according to the first exemplary embodiment.

FIGS. 6A and 6B illustrate a configuration of the consumable information transmitted to the consumable management server according to the first exemplary embodiment.

FIG. 11 is a flowchart illustrating processing for updating consumable information according to a third exemplary embodiment.

FIGS. 12A and 12B illustrate a configuration of consumable information transmitted to the consumable management server according to the third exemplary embodiment.

FIG. 14 is a block diagram schematically illustrating a software configuration of the consumable management server according to the first exemplary embodiment.

FIG. 15 is a block diagram schematically illustrating a software configuration of a printer according to the second exemplary embodiment.

DESCRIPTION OF THE EMBODIMENTS

Figure 1:
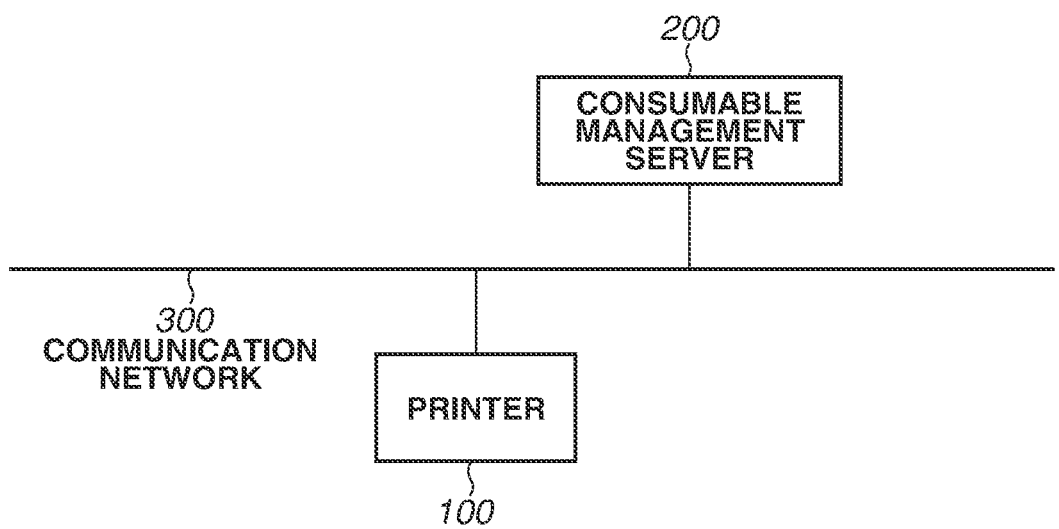
FIG. 1 illustrates an overall configuration of a processing system according to a first exemplary embodiment.

Exemplary embodiments of the present disclosure will be described below with reference to the accompanying drawings. In the drawings, identical or corresponding constituent members, constituent apparatuses, and constituent portions are assigned the same reference numerals. The following exemplary embodiments are not intended to limit the present disclosure defined in the claims. Not all of the combinations of the features described in the present exemplary embodiments are indispensable to the solutions for the present disclosure.

FIG. 1 illustrates an overall configuration of a processing system according to a first exemplary embodiment. A processing system 10 includes a printer 100 as a processing apparatus and a consumable management server 200 connected with the printer 100 via a communication network 300 such as the Internet. The printer 100 records consumable information in a nonvolatile memory (NVM) 104 of the printer 100 (described below) and transmits the recorded consumable information to the consumable management server 200 via the communication network 300. Communication between the printer 100 and the consumable management server 200 is performed by use of HyperText Transfer Protocol (HTTP) or the like and is controlled by a known control method. While the printer 100 and the consumable management server 200 are configured to directly transmit the consumable information via the Internet, the present disclosure is not limited thereto. For example, a relay server (not illustrated) may be disposed, and the consumable information transmitted from the printer 100 may be once collected and stored in the relay server via the Internet. Then, the relay server may transmit consumable information collected from printers other than the printer 100 to the consumable management server 200. The consumable information will be described in detail below.

Figure 2:
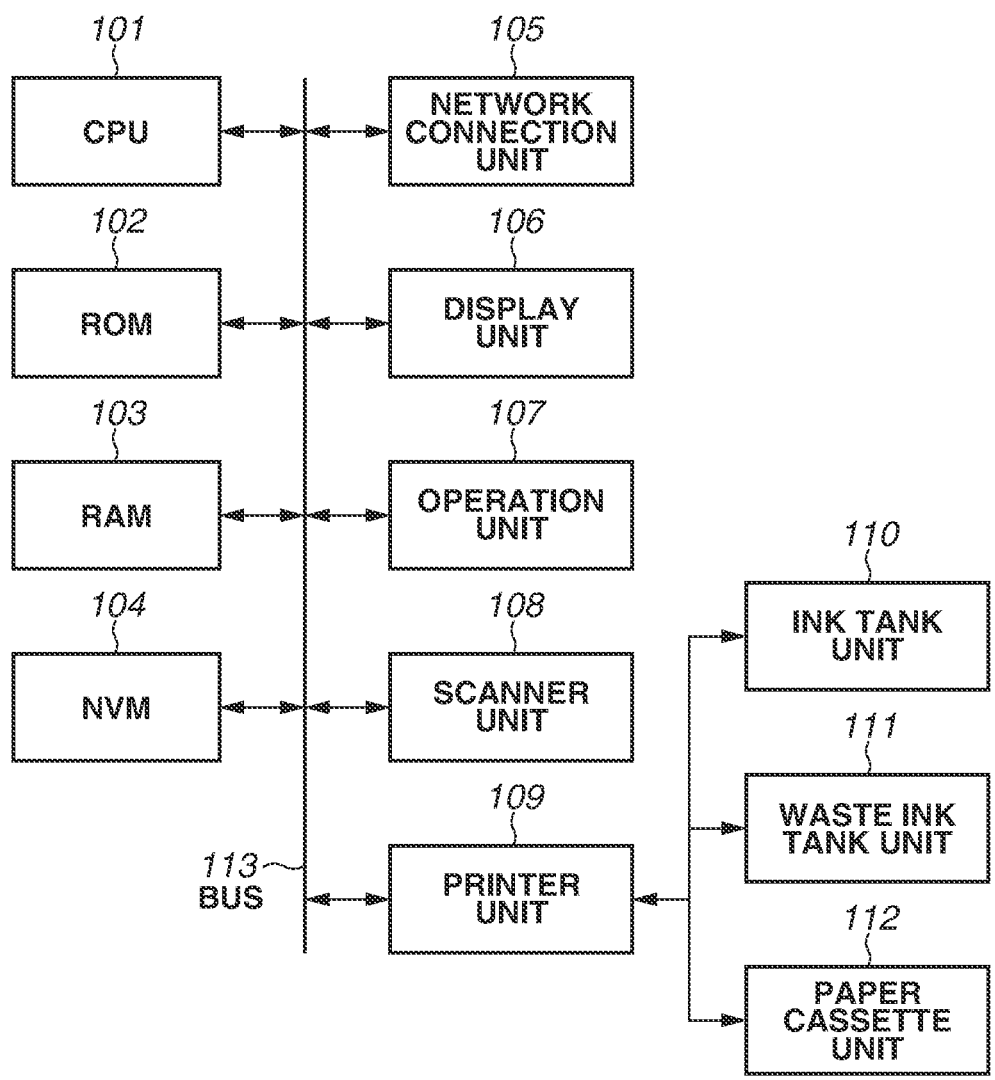
FIG. 2 is a block diagram schematically illustrating a hardware configuration of a printer according to the first exemplary embodiment.

FIG. 2 is a block diagram schematically illustrating a hardware configuration of the printer 100. The printer 100 includes a central processing unit (CPU) 101, a read only memory (ROM) 102, a random access memory (RAM) 103, and the NVM 104. The CPU 101 is a central processor that controls each unit in the printer 100. Various program codes are stored in the ROM 102. The RAM 103 is used to temporarily store data such as image data and used for buffering when each service is executed. The RAM 103 also stores image data received by a network connection unit 105 (described below). The NVM 104, which is a nonvolatile memory, stores nonvolatile information. For example, the NVM 104 stores individual identification information and shipping destination information for the printer 100, and a setting of a language to be displayed on a display unit 106. In the printer 100 according to the first exemplary embodiment, information about a lifetime cumulative consumption amount of consumables (described below) is also stored in the NVM 104.

The printer 100 includes the network connection unit 105 that connects with an external apparatus via a universal serial bus (USB) or network. More specifically, the network connection unit 105 is connected to the USB or network to communicate with the external apparatus. In the present exemplary embodiment, the printer 100 communicates with the consumable management server 200 via the communication network 300 by using the network connection unit 105.

The printer 100 includes the display unit 106 and an operation unit 107. The display unit 106 includes, for example, a liquid crystal display unit, and can display a text, an image, and an indicator. The display unit 106 may include not the liquid crystal display unit but a light emitting diode (LED) display or another display unit. Examples of information to be displayed by the display unit 106 include setting information for the printer 100 and information about ink stored in ink tanks (remaining ink amount). Driving of the display unit 106 is controlled by the CPU 101. The operation unit 107 includes a switch and a hardware key used by the user to perform various input operations. As in the case of a touch panel, the display unit 106 can also be configured to function as an operation unit for receiving input operations.

The printer 100 also includes a scanner unit 108, a printer unit 109, an ink tank unit 110, a waste ink tank unit 111, and a paper cassette unit 112. The scanner unit 108 optically reads a document placed on a document positioning plate to generate electronic data, converts the generated data into image data having a specified file format, and transmits the image data to an external apparatus via the communication network 300 or stores the image data in a storage area such as a hard disk (not illustrated). The printer 100 also has a copy function. The copy function is implemented when the scanner unit 108 reads a document placed on the document positioning plate to generate image data and transmits the generated image data to the printer unit 109, and then the printer unit 109 records an image on a recording medium based on the image data. On the printer 100, a scanner function is implemented by the scanner unit 108, and a print function is implemented by the printer unit 109.

The printer unit 109 is supplied with ink from the ink tank unit 110 and performs print processing on a recording medium such as printing paper. The printer unit 109 prints an image on a recording medium by an ink jet method based on image data received from the outside or image data read by the scanner unit 108. The printing method of the printer unit 109 is not limited to the ink jet method but may be another printing method such as an electrophotographic method.

The ink tank unit 110 for storing ink is provided with an ink injection slot through which ink is injected from an ink bottle into the ink tank unit 110. The ink bottle of the ink tank unit 110 according to the present exemplary embodiment does not have individual identification information. The ink tank unit 110 may be configured in a different way. An ink cartridge filled with ink is attached to the ink tank unit 110, and the ink in the ink cartridge is supplied to the printer unit 109 when printing is performed. For example, the printer 100 includes a carriage for moving the printer unit 109 relative to the recording medium to perform scanning, and the carriage attached with the ink cartridge constitutes the ink tank unit 110 according to the present exemplary embodiment. Not only an ink cartridge not having individual identification information can be attached to the carriage but also an ink cartridge having the individual identification information can be attached thereto.

Ink information such as the remaining ink amount is calculated based on an ink consumption amount based on an amount of ink discharged onto the recording medium by the printer unit 109 and an amount of ink discharged to a non-recording medium area by the printer unit 109, and an amount of ink with which the ink cartridge attached to the ink tank unit 110 can be filled. In the configuration where ink is injected from an ink bottle, the remaining ink amount may be calculated based on the capacity of the ink bottle and the ink consumption amount. If a sensor for detecting the remaining ink amount is installed in the ink tank unit 110, a result of calculation of the remaining ink amount may be corrected by use of the sensor, or the remaining ink amount may be calculated only with the sensor.

The waste ink tank unit 111 stores waste ink generated while the printer unit 109 performs print processing with ink supplied from the ink tank unit 110. Waste ink refers to ink used in ink discharge other than ink discharge onto the recording medium, such as ink suction performed before the ink discharge onto the recording medium to stabilize ink discharge. As status information indicating the remaining capacity of the waste ink tank unit 111, the remaining capacity for storing waste ink is calculated based on an amount of waste ink used for the non-recording medium area by the printer unit 109 and the capacity of the waste ink tank unit 111. At this time, if a sensor for detecting the waste ink amount is installed in the waste ink tank unit 111, a result of calculation of the remaining capacity may be corrected by use of the sensor, or the remaining capacity for storing waste ink in the waste ink tank unit 111 may be calculated only with the sensor. While the waste ink tank unit 111 according to the present exemplary embodiment is configured to be detachable from the printer 100 for replacement, the present disclosure is not limited thereto. The waste ink tank unit 111 may be built into hardware of the printer 100 and unable to be detached by the user for replacement. However, in such a case, the waste ink tank unit 111 is not a target consumable of an automatic delivery service according to the present exemplary embodiment (described below). The waste ink tank unit 111 according to the present exemplary embodiment may be attached not only with a waste ink tank not having the individual identification information but also with a waste ink tank having the individual identification information.

The paper cassette unit 112 stores a recording medium such as printing paper to be supplied to the printer unit 109. The printer unit 109 performs printing on the supplied paper to form an image. As paper information such as a remaining paper amount in the paper cassette unit 112, the remaining paper amount is calculated based on a paper amount (the number of sheets) supplied to the printer unit 109 and a paper amount stored in the paper cassette unit 112. If a sensor for detecting the paper amount stored in the paper cassette unit 112 is installed, a result of calculation of the remaining paper amount may be corrected by use of the sensor, or the remaining paper amount may be calculated only with the sensor. The paper cassette unit 112 may be configured to be replaced in its entirety when paper runs out. With this configuration, paper cannot be supplied to the paper cassette unit 112, and the entire paper cassette unit 112 is replaced to supply paper.

The units of the printer 100 are connected with each other via a bus 113 so that they can transmit and receive data between each other.

Figure 13:
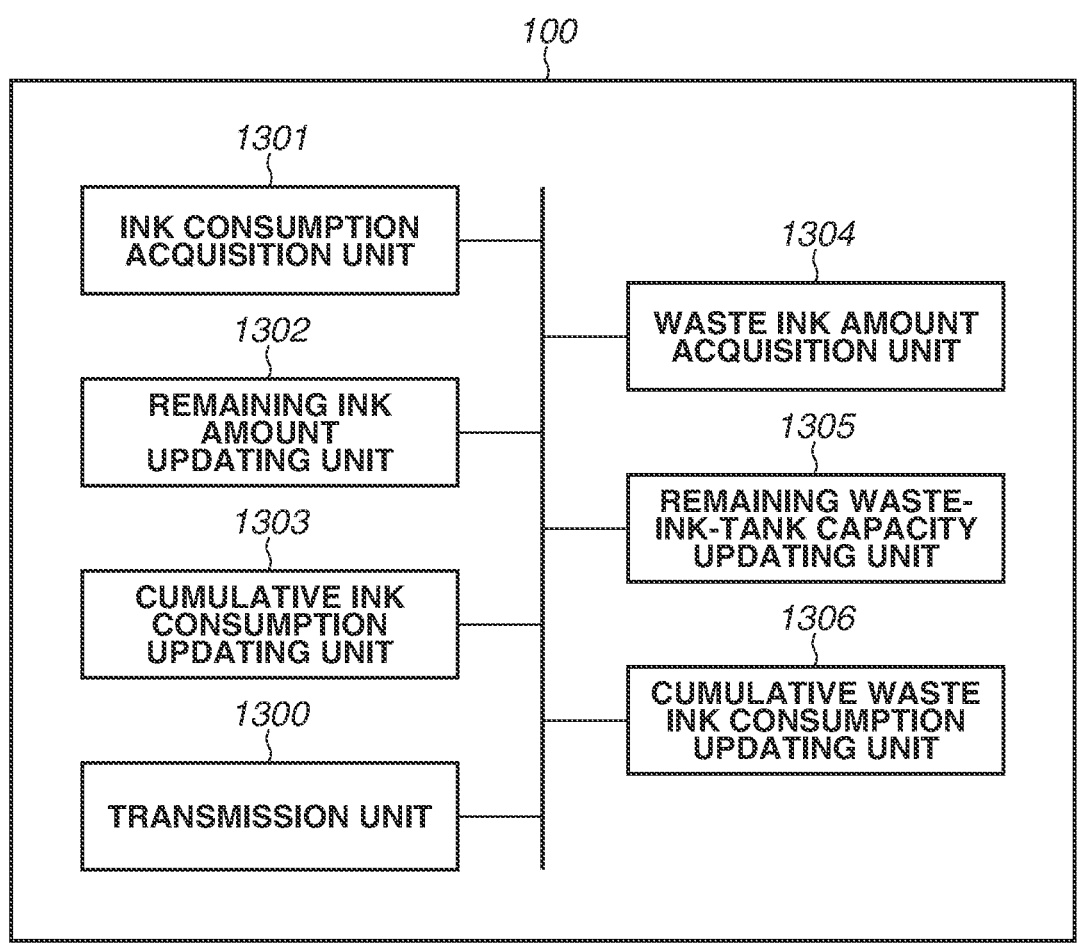
FIG. 13 is a block diagram schematically illustrating a software configuration of the printer according to the first exemplary embodiment.

FIG. 13 illustrates a software configuration of the printer 100. Each function unit in FIG. 13 is implemented by the CPU 101 executing a software program stored in the ROM 102. When the printer 100 consumes ink in print processing, an ink consumption acquisition unit 1301 acquires an ink consumption amount for each ink color. A remaining ink amount updating unit 1302 reduces remaining ink amount information for each ink color to update the information. A cumulative ink consumption updating unit 1303 updates lifetime cumulative ink consumption amount for each ink color. A waste ink amount acquisition unit 1304 acquires the waste ink amount generated in the print processing. A remaining waste-ink-tank capacity updating unit 1305 updates remaining waste-ink-tank capacity information. A cumulative waste ink consumption updating unit 1306 updates lifetime cumulative waste ink amount.

Figure 3:
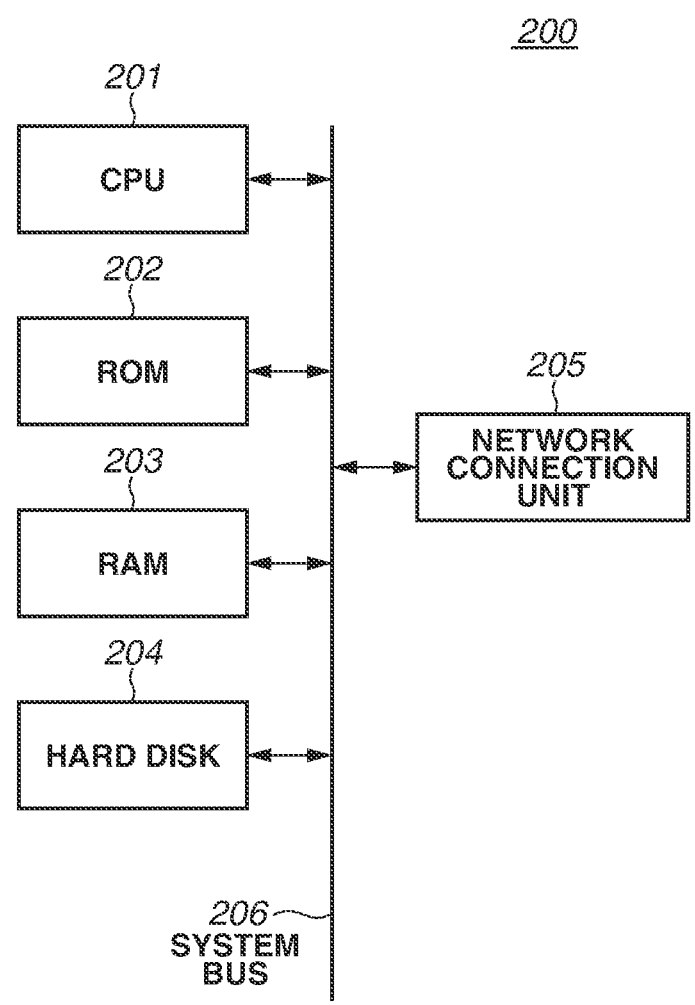
FIG. 3 is a block diagram schematically illustrating a hardware configuration of a consumable management server according to the first exemplary embodiment.

FIG. 3 is a block diagram schematically illustrating a hardware configuration of the consumable management server 200.

A CPU 201 performs calculation, determination, and control of data and instructions based on software stored in a ROM 202, a RAM 203, or a hard disk 204. The RAM 203 is used as a temporary storage area when the CPU 201 performs various processing. The hard disk 204 records an operating system (OS), application software, and a program. A recording table of a delivery status for each piece of individual identification information for the consumable (described below with reference to FIG. 7), and a recording table of a lifetime cumulative consumption amount at the time of the last consumable delivery for each piece of individual identification information for the printer are recorded in the hard disk 204.

A system bus 206 transfers data between the CPU 201 and information storage units such as the ROM 202, the RAM 203, and the hard disk 204. A network connection unit 205 transfers data to and from an apparatus on the same network or the Internet based on Transmission Control Protocol/Internet Protocol (TCP/IP) by using a wireless or wired local area network (LAN) conforming to a standard such as IEEE802.11a. The configuration of the present exemplary embodiment is not limited thereto. Services that can be offered by the consumable management server 200 may be implemented by use of a server on a cloud. The consumable management server 200 is not necessarily formed of one server. Functions offered by the consumable management server 200 may be implemented by a server system including a plurality of servers.

FIG. 14 illustrates a software configuration of the consumable management server 200. Each function unit in FIG. 14 is implemented by the CPU 201 executing a software program stored in the ROM 202.

An overall sequence of the automatic consumable delivery service according to the first exemplary embodiment will be described below with reference to FIG. 4. In step S401, a user 400 operates an external terminal or the printer 100 to issue a print or copy instruction to the printer 100. Upon reception of the print or copy instruction, then in step S402, the printer 100 performs print processing by using the printer unit 109 and the scanner unit 108. In step S403, the printer 100 updates the consumable information recorded in the NVM 104 in the printer 100 based on consumption amounts of the consumables consumed in the print processing in step S402. Processing for updating the consumable information will be described in detail below with reference to FIG. 5.

In step S404, a transmission unit 1300 of the printer 100 transmits the consumable information updated in step S403 together with the individual identification information for the printer 100 to the consumable management server 200 via the network connection unit 105. The consumable information transmitted in step S404 will be described in detail below with reference to FIGS. 6A and 6B.

Upon reception of the consumable information from the printer 100 via a reception unit 1400, in step S405, the consumable management server 200 determines whether to deliver a replacement based on the remaining amount or the degree of depletion of a consumable in the individual identification information and the consumable information for the printer 100. Instead of determining whether to immediately deliver the replacement, the consumable management server 200 may determine the timing of delivering the replacement. In step S405, the consumable management server 200 also manages the consumable delivery status to avoid duplicated delivery of the replacement for the consumable. The determination of the consumable delivery in step S405 will be described in detail below with reference to FIG. 7.

In step S406, the consumable management server 200 performs consumable delivery processing so that the relevant consumable determined to be delivered in step S405 is delivered to the user. Instead of being performed by the consumable management server 200, the consumable delivery processing may be performed by a delivery service server that provides the delivery service upon reception of a request from the consumable management server 200. While the sequence performs the processing in steps S402 to S406 by using a print instruction as a trigger, the trigger is not limited thereto. The sequence may perform the processing in steps S402 to S406 by using an event that involves ink consumption as a trigger.

The processing for updating the consumable information in step S403 in FIG. 4 will be described with reference to the flowchart in FIG. 5. The descriptions will be provided on a case where the consumables of the printer 100 are the ink cartridge attached to the ink tank unit 110 and the waste ink tank of the waste ink tank unit 111.

In step S501, the ink consumption acquisition unit 1301 acquires the ink consumption amount for each ink color when ink is consumed in the print processing in step S402. The ink consumption amount includes the consumption amount of ink not directly related to printing, such as ink discharge to the non-recording medium area. In the present exemplary embodiment, the ink consumption acquisition unit 1301 acquires the ink consumption amount for each ink color based on a dot count value of ink discharged by the printer unit 109. The ink consumption acquisition unit 1301 may also estimate the ink consumption amount based on the paper amount used for the print processing.

In step S502, the remaining ink amount updating unit 1302 reduces the remaining ink amount information for each ink color recorded in the NVM 104 in the printer 100 to update the information based on the ink consumption amount acquired in step S501. This enables obtainment of the remaining ink amount for each ink color currently used by the printer 100. In step S503, the cumulative ink consumption updating unit 1303 adds the ink consumption amount acquired in step S501 to the lifetime cumulative ink consumption amount for each ink color recorded in the NVM 104 in the printer 100. When the ink cartridge is replaced or ink is injected from the outside into the ink cartridge, the remaining ink amount information updated in step S502 is reset. On the other hand, the lifetime cumulative ink consumption amount updated in step S503 is not reset by a user operation such as the replacement of the ink cartridge but is kept being added as a cumulative value of the printer 100.

In step S504, the waste ink amount acquisition unit 1304 acquires the waste ink amount generated in the print processing in step S402. In the present exemplary embodiment, the waste ink amount acquisition unit 1304 acquires a waste ink consumption amount based on the dot count value of ink having not directly contributed to printing during the print processing. The waste ink consumption amount may be estimated based on the paper amount used in the print processing. In step S505, the remaining waste-ink-tank capacity updating unit 1305 reduces the remaining waste-ink-tank capacity information recorded in the NVM 104 in the printer 100 to update the information based on the waste ink amount acquired in step S504. Subsequently, in step S506, the cumulative waste ink consumption updating unit 1306 adds the waste ink amount acquired in step S504 to the lifetime cumulative waste ink amount recorded in the NVM 104 in the printer 100. When the waste ink tank is replaced, the remaining waste-ink-tank capacity information updated in step S505 is reset. On the other hand, the lifetime cumulative waste ink amount updated in step S506 is not reset by a user operation such as the replacement of the waste ink tank but is kept being added as a cumulative value of the printer 100.

The consumable information transmitted from the printer 100 to the consumable management server 200 in step S404 in FIG. 4 will be described below with reference to FIGS. 6A and 6B. The consumable information transmitted to the consumable management server 200 in step S404 has a different configuration between a case where the relevant consumable has the individual identification information and a case where the relevant consumable does not have the relevant information. FIG. 6A illustrates a case where the target ink cartridge and waste ink tank have the individual identification information, and FIG. 6B illustrates a case where the target ink cartridge and waste ink tank do not have the individual identification information.

If the target consumables have the individual identification information, as illustrated in FIG. 6A, the consumable information to be transmitted to the consumable management server 200 includes the individual identification information for the printer 100, and the individual identification information and remaining amount information or remaining capacity information for each consumable. The consumable information for the ink cartridge includes the ink cartridge individual identification information and the remaining ink amount information for each ink color. The consumable information for the waste ink tank includes the waste ink tank individual identification information and the remaining waste-ink-tank capacity information.

If the target consumables do not have the individual identification information, the consumable information to be transmitted to the consumable management server 200 includes the individual identification information for the printer 100, and the lifetime cumulative consumption amount for each consumable, as illustrated in FIG. 6B. The lifetime cumulative consumption amount of the ink cartridge is lifetime cumulative ink consumption amount for each ink color, and the lifetime cumulative consumption amount of the waste ink tank is the lifetime cumulative waste ink amount. The remaining ink amount information, the remaining waste-ink-tank capacity information, the lifetime cumulative ink consumption amount, and the lifetime cumulative waste ink amount are managed by the processing for updating the consumable information described above with reference to FIG. 5.

Figure 7:
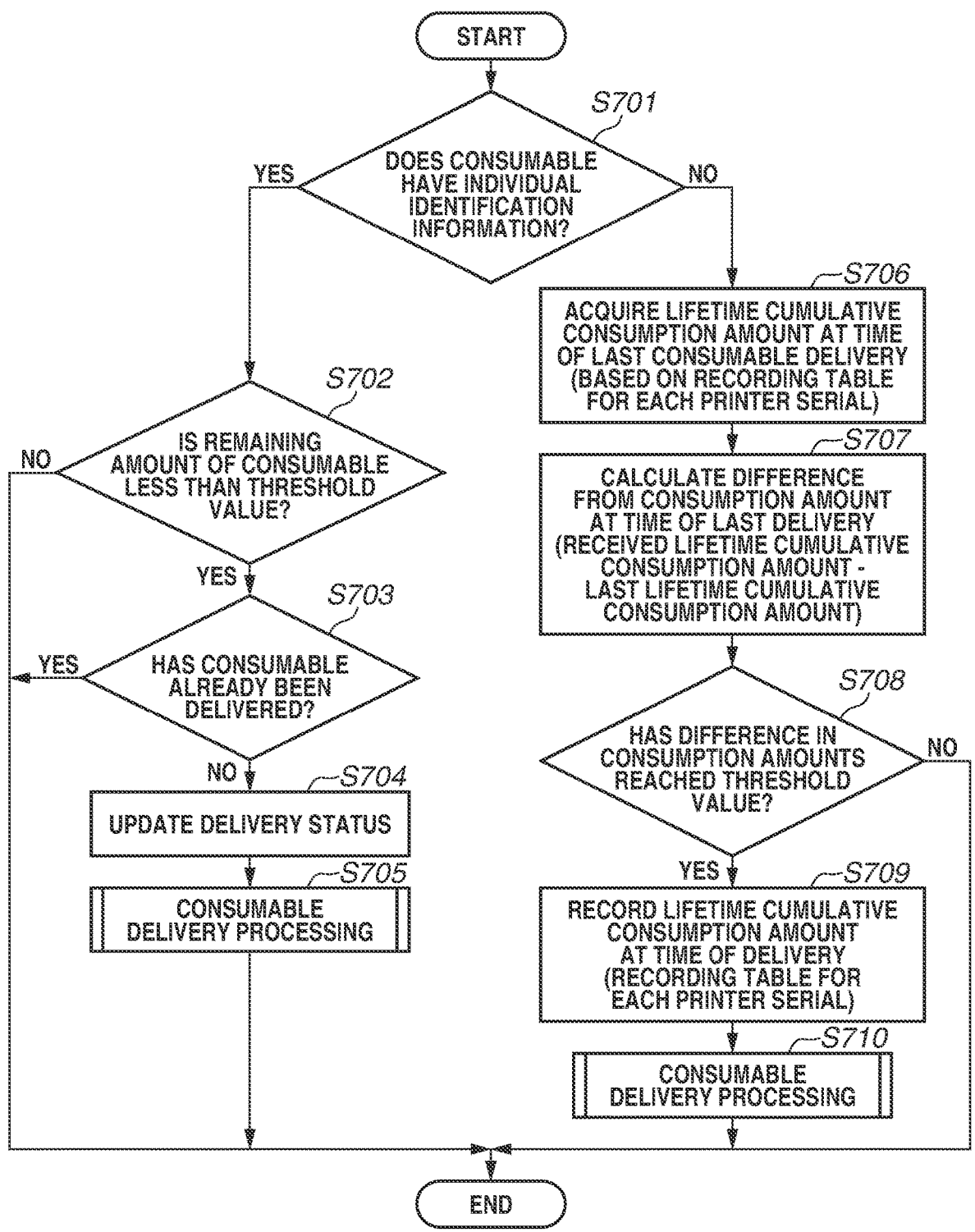
FIG. 7 is a flowchart illustrating processing for determining whether to perform consumable delivery according to the first exemplary embodiment.

The determination of the consumable delivery in step S405 in FIG. 4 will be described below with reference to the flowchart in FIG. 7. Upon reception of the consumable information, in step S701, an individual identification information determination unit 1401 of the consumable management server 200 determines whether the target consumable has individual identification information based on the consumable information. When the target consumable is determined to have the individual identification information (YES in step S701), the processing proceeds to step S702. On the other hand, when the target consumable is determined not to have the individual identification information (NO in step S701), the processing proceeds to step S706. In step S702, a remaining consumable amount determination unit 1402 refers to the remaining amount of the target consumable in the received consumable information to determine whether the remaining amount is less than a threshold value. When the remaining amount of the consumable is determined to be less than the threshold value (YES in step S702), the processing proceeds to step S703. On the other hand, when the remaining amount of the consumable is determined not to be less than the threshold value (NO in step S702), the processing exits the flowchart. The consumable information may include an amount of depletion (degree of depletion) of the consumable. In this case, the remaining consumable amount determination unit 1402 may determine whether the remaining amount of the consumable exceeds the threshold value, i.e., whether depletion of the consumable has progressed to a considerable degree.

In step S703, a delivery status determination unit 1403 checks whether the replacement has already been delivered for the consumable of which the remaining amount is less than the threshold value. The checking is intended to prevent the duplicated delivery of the replacement for the same consumable. The consumable management server 200 maintains a recording table of the delivery status for each piece of individual identification information for the consumable in the hard disk 204. The recording table records whether delivery processing has been performed as the delivery status for each piece of individual identification information for the consumable. In step S703, the delivery status determination unit 1403 searches for the individual identification information for the consumable of which the remaining amount is less than the threshold value in the recording table to determine whether the consumable has already been delivered. When the consumable has not been delivered (NO in step S703), the processing proceeds to step S704. On the other hand, when the consumable has already been delivered (YES in step S703), the processing exits the flowchart.

In step S704, in performing the processing for delivering the replacement for the consumable, a recording table updating unit 1404 updates the delivery status in the recording table from "Not Delivered" to "Delivered". Subsequently, in step S705, a shipment processing execution unit 1405 performs the consumable delivery processing for delivering the replacement for the consumable to the user. In the consumable delivery processing, the consumable management server 200 may directly issue a delivery order, or access a delivery service provision system to request the system for the delivery processing.

The description returns to step S701, and the processing when the consumable does not have the individual identification information will be described. When the individual identification information determination unit 1401 determines that the consumable does not have the individual identification information (NO in step S701), the processing proceeds to step S706. In step S706, a cumulative consumption acquisition unit 1406 acquires the lifetime cumulative consumption amount of the target consumable at the time of the last delivery of the replacement for the consumable. To manage the lifetime cumulative consumption amount at the time of the last delivery, the consumable management server 200 maintains the recording table of lifetime cumulative consumption amounts of consumables for each printer in the hard disk 204. The recording table records the individual identification information for the printer and the lifetime cumulative consumption amounts of the consumables at the time of the last delivery for the consumables. Similar to the lifetime cumulative consumption amount described above with reference to FIG. 5, the lifetime cumulative consumption amounts at the time of the last delivery for the consumables are not reset by a user operation but are kept being added as cumulative consumption amounts of the printer 100. The timing of updating the recording table will be described below in step S709.

In step S707, a cumulative consumption difference calculation unit 1407 calculates, for each consumable, a difference between the lifetime cumulative consumption amount in the received consumable information and the lifetime cumulative consumption amount at the time of the last delivery for the consumable acquired in step S706. More specifically, the cumulative consumption difference calculation unit 1407 calculates the difference from the lifetime cumulative consumption amount at the time of the last delivery for the consumable for each consumable type and for each color (when the consumable is the ink cartridge). The calculated difference is equivalent to a used amount, or amount of consumption, of the consumable from the time of the last delivery of the replacement for the consumable to the user. The lifetime cumulative consumption amount in the consumable information according to the present exemplary embodiment refers to the lifetime cumulative ink consumption amount of the ink cartridge and the lifetime cumulative waste ink amount of the waste ink tank.

In step S708, a consumable consumption determination unit 1408 determines whether the amount of consumption (used amount) from the time of the last delivery calculated in step S707 has reached or exceeded a threshold value. The threshold value used in step S708 is different from the threshold value used in the determination in step S702. When the used amount from the time of the last delivery has reached or exceeded the threshold value (YES in step S708), i.e., when the depletion of the consumable has progressed to a considerable degree or the remaining amount of the consumable has been reduced, the processing proceeds to step S709. On the other hand, when the used amount from the time of the last delivery is less than the threshold value (NO in step S708), the processing exits the flowchart. In step S709, in performing the processing for delivering the replacement for the consumable, the recording table updating unit 1404 updates a value in the recording table of the lifetime cumulative consumption amount at the time of the last delivery with a value of the lifetime cumulative consumption amount of the consumable information received by the consumable management server 200. Thus, the processing manages the lifetime cumulative consumption amount of the relevant consumable when the delivery processing is performed.

Lastly, in step S710, the shipment processing execution unit 1405 performs the consumable delivery processing for delivering the replacement for the consumable to the user, similar to step S705. In the consumable delivery processing, the consumable management server 200 may directly issue a delivery order, or access a delivery service provision system to request the system for the delivery processing.

In the present exemplary embodiment, even for a consumable not having the individual identification information, the printer 100 determines whether the consumable delivery is required based not on the remaining amount and the used amount of each consumable but on the lifetime cumulative consumption amount of the printer 100 through the processing from step S706 and subsequent steps. In the present exemplary embodiment, the consumable management server 200 enables prevention of the duplicated delivery by managing the delivery status for each piece of individual identification information for the printer. The configuration according to the present exemplary embodiment enables suitable management of the delivery of the consumable not having the individual identification information.

If the consumable has the individual identification information, the printer 100 determines whether the delivery of the replacement is required based on the remaining amount or the remaining capacity of each consumable, and manages the delivery status for each piece of individual identification information for the consumable through the processing from step S702 and subsequent steps, thus preventing the duplicated delivery.

While the present exemplary embodiment has been described above using the example of the printer 100 which may possibly use both a consumable not having the individual identification information and a consumable having the individual identification information, the printer 100 may use only the consumable not having the individual identification information. In this case, the consumable management server 200 does not determine whether the relevant consumable has the individual identification information in step S701.

A second exemplary embodiment will be described below. Components having been described above with reference to the first exemplary embodiment will be assigned the same reference numerals, and redundant descriptions thereof will be omitted.

In the first exemplary embodiment, the consumable management server 200 determines the consumable delivery in step S405 in FIG. 4. In the second exemplary embodiment, a configuration is described in which the printer 100 determines the consumable delivery.

FIG. 15 illustrates a software configuration of the printer 100 according to the present exemplary embodiment. Each function unit in FIG. 15 is implemented by the CPU 101 executing a software program stored in the ROM 102. The printer 100 according to the present exemplary embodiment includes an individual identification information determination unit 1307, a remaining consumable amount determination unit 1308, a delivery requesting unit 1309, and a cumulative consumption acquisition unit 1310 in addition to the above-described units according to the first exemplary embodiment. The printer 100 according to the present exemplary embodiment further includes a cumulative consumption difference calculation unit 1311, a consumable consumption determination unit 1312, and a recording table updating unit 1313. The software configuration of the consumable management server 200 may be identical to that according to the first exemplary embodiment. Alternatively, some functions installed on the printer 100 may be removed from the software configuration of the consumable management server 200.

Figure 8:
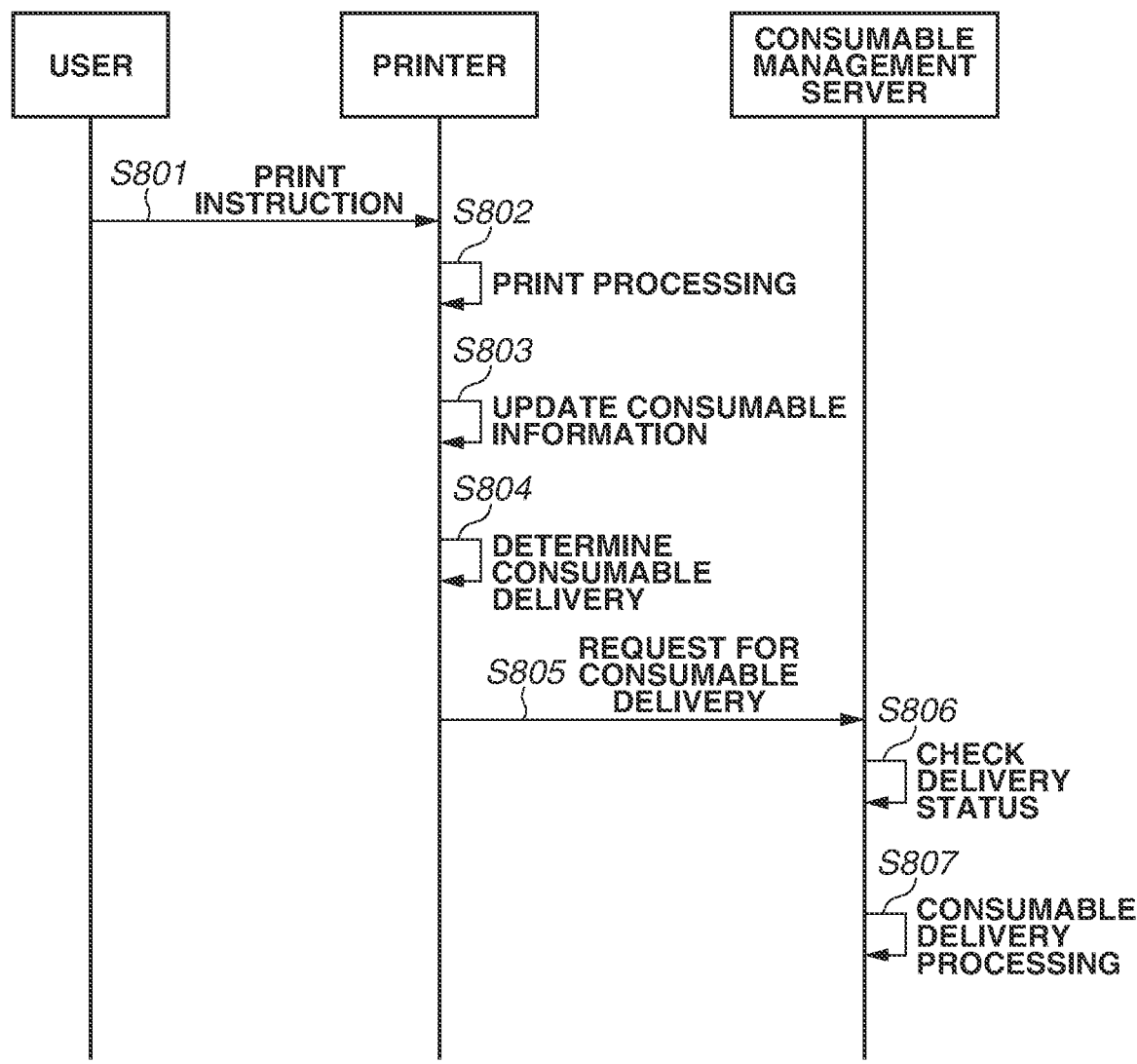
FIG. 8 is an overall sequence diagram illustrating an automatic consumable delivery service according to a second exemplary embodiment.

FIG. 8 illustrates an overall sequence of the automatic consumable delivery service according to the present exemplary embodiment.

Processing in steps S801, S802, S803, and S807 in FIG. 8 is identical to the processing in steps S401, S402, S403, and S406 in FIG. 4, respectively, described above with reference to the first exemplary embodiment, and thus redundant descriptions thereof will be simplified.

In step S801, a user operates an external terminal or the printer 100 to issue a print or copy instruction to the printer 100. Upon reception of the print instruction, then in step S802, the printer 100 performs print processing according to an instruction by the user by using the printer unit 109 and the scanner unit 108. In step S803, the printer unit 109 updates the consumable information recorded in the NVM 104 in the printer 100 based on consumption amounts of the consumables consumed in the print processing in step S802.

In step S804, the printer 100 determines whether to deliver the replacement based on the remaining amount or the degree of depletion of a consumable. Instead of determining whether to immediately deliver the replacement, the printer 100 may determine the timing of delivering the replacement. The determination of the consumable delivery in step S804 will be described in detail below with reference to FIG. 9. When the printer 100 determines to deliver the consumable in step S804, the processing proceeds to step S805.

In step S805, the printer 100 transmits, as a delivery request, the individual identification information for the printer 100 and the individual identification information for the consumable subjected to the delivery request to the consumable management server 200 via the network connection unit 105. However, if the consumable subjected to the delivery request does not have the individual identification information, the printer 100 transmits only the individual identification information for the printer 100.

Upon reception of the delivery request of the consumable from the printer 100, then in step S806, the consumable management server 200 checks the consumable delivery status to avoid the duplicated delivery of the consumable based on the individual identification information for the printer 100 and the individual identification information for the target consumable. The checking of the consumable delivery status in step S806 will be described in detail below with reference to FIG. 10.

If the target consumable has not been delivered, then in step S806, the consumable management server 200 performs the consumable delivery processing to deliver the target consumable to the user. In the consumable delivery processing, the consumable management server 200 may directly issue a delivery order, or access a delivery service provision system to request the system for the delivery processing.

While, in the sequence, a print instruction acts as a trigger for performing the processing in steps S802 to S807, the trigger is not limited thereto. Another event involving ink consumption may serve as a trigger for performing the processing in steps S802 to S807.

Figure 9:
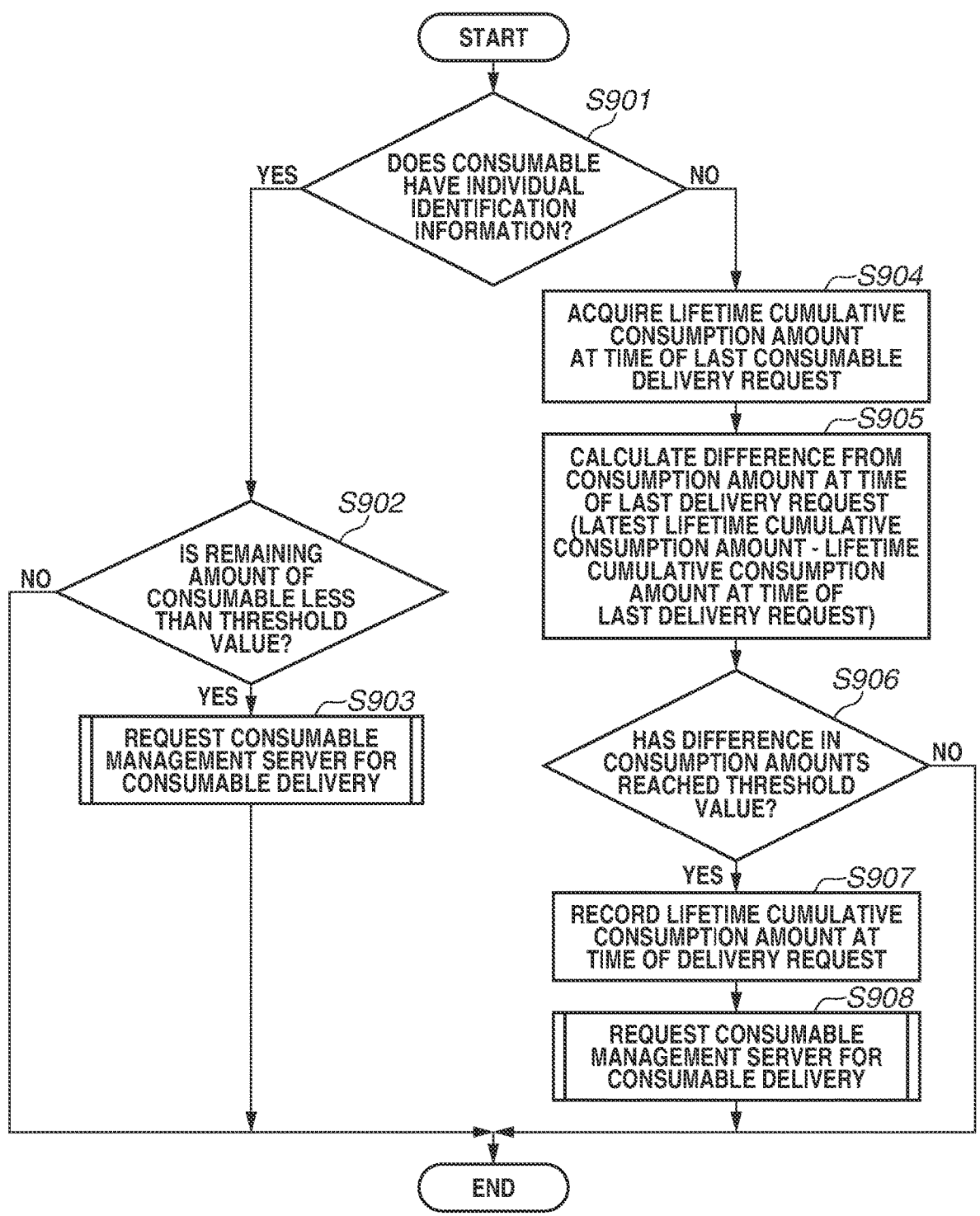
FIG. 9 is a flowchart illustrating processing for determining whether to perform consumable delivery according to the second exemplary embodiment.

The determination of the consumable delivery in step S804 will be described in detail below with reference to the flowchart in FIG. 9. In step S901, the individual identification information determination unit 1307 checks whether a delivery target consumable has the individual identification information. When the target consumable is determined to have the individual identification information (YES in step S901), the processing proceeds to step S902. On the other hand, when the target consumable is determined not to have the individual identification information (NO in step S901), the processing proceeds in step S904.

In step S902, i.e., when the target consumable is determined to have the individual identification information, the remaining consumable amount determination unit 1308 refers to the remaining amount of the consumable in the recorded consumable information to determine whether the remaining amount of the consumable is less than a threshold value. When the remaining amount of the consumable is determined to be less than the threshold value (YES in step S902), the processing proceeds to step S903. On the other hand, when the remaining amount of the consumable is determined not to be less than the threshold value (NO in step S902), the processing exits the flowchart. The consumable information may include an amount of depletion (degree of depletion) of the consumable. In this case, the printer 100 may determine whether the remaining amount of the consumable exceeds the threshold value, i.e., whether depletion of the consumable has progressed to a considerable degree.

In step S903, the delivery requesting unit 1309 requests, via the transmission unit 1300, the consumable management server 200 to deliver the replacement for the consumable to the user. At this time, the printer 100 transmits, as a delivery request, the individual identification information for the printer 100 and the individual identification information for the consumable subjected to the delivery request to the consumable management server 200.

A processing flow when the delivery target consumable does not have the individual identification information will be described below. In step S904, i.e., when the delivery target consumable does not have the individual identification information, the cumulative consumption acquisition unit 1310 acquires the lifetime cumulative consumption amount at the time when the delivery requesting unit 1309 last requested the consumable management server 200 to deliver the replacement for the consumable subjected to the delivery request. To manage the lifetime cumulative consumption amount at the time of the last delivery request, the printer 100 maintains the recording table of the lifetime cumulative consumption amount for each consumable in the NVM 104. The recording table records, for each consumable, the lifetime cumulative consumption amount when the delivery requesting unit 1309 last requested the consumable management server 200 to deliver the consumable. Similar to the lifetime cumulative consumption amount described above with reference to FIG. 5, the lifetime cumulative consumption amount at the time of the last consumable delivery request is not reset by a user operation but is kept being added as a cumulative consumption amount of the printer 100. The timing of updating the recording table will be described below in step S907.

In step S905, the cumulative consumption difference calculation unit 1311 calculates, for each consumable, a difference between the lifetime cumulative consumption amount stored in the cumulative consumption difference calculation unit 1311 and the lifetime cumulative consumption amount at the time of the last consumable delivery request acquired in step S904. The calculated difference is equivalent to the used amount, or amount of consumption, of the consumable from the time when the printer 100 last requested the consumable management server 200 to deliver the replacement for the consumable.

In step S906, the consumable consumption determination unit 1312 determines whether the amount of consumption (used amount) from the time of the last delivery request calculated in step S905 has reached or exceeded a threshold value. When the used amount from the time of the last delivery request has reached or exceeded the threshold value (YES in step S906), i.e., when the depletion of the consumable has progressed to a considerable degree or the remaining amount of the consumable has been reduced, the processing proceeds to step S907. On the other hand, when the used amount from the time of the last delivery request is less than the threshold value (NO in step S906), the processing exits the flowchart.

In step S907, in issuing a request for delivering the replacement for the consumable, the recording table updating unit 1313 updates a value in the recording table of the lifetime cumulative consumption amount at the time of the last delivery request to a value of the latest lifetime cumulative consumption amount. Thus, the processing manages the lifetime cumulative consumption amount of the target consumable when the delivery request is issued. Lastly, in step S908, similar to step S903, the delivery requesting unit 1309 performs communication to request the consumable management server 200 to deliver the replacement for the consumable to the user. Then, the delivery requesting unit 1309 transmits the individual identification information for the printer 100 and information about the consumable subjected to the delivery request to the consumable management server 200 via the transmission unit 1300.

Figure 10:
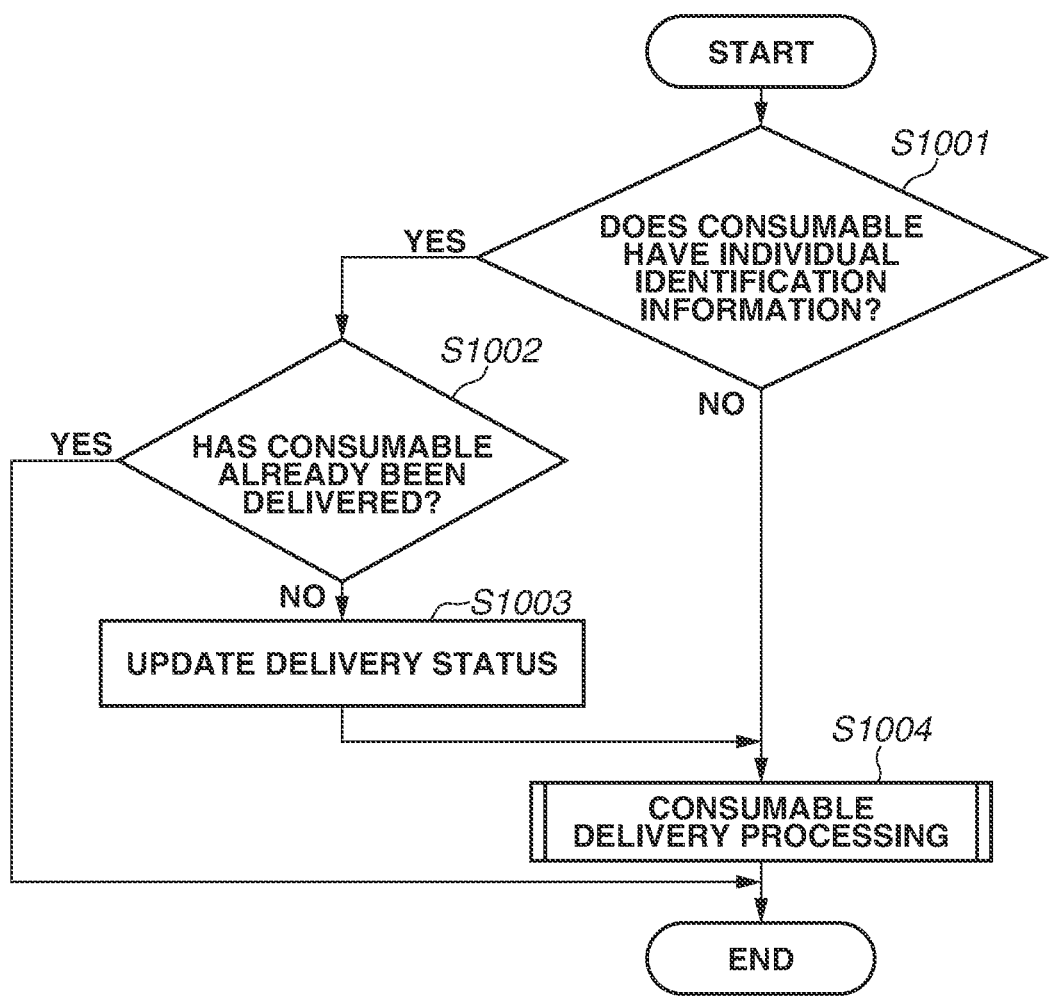
FIG. 10 is a flowchart illustrating processing for checking a consumable delivery status according to the second exemplary embodiment.

Next, the checking of the consumable delivery status performed by the consumable management server 200 in step S806 in FIG. 8 will be described with reference to the flowchart in FIG. 10. In step S1001, the individual identification information determination unit 1401 determines whether the consumable having been subjected to the delivery request has the individual identification information. When the consumable having been subjected to the delivery request is determined to have the individual identification information (YES in step S1001), the processing proceeds to step S1002. On the other hand, when the consumable having been subjected to the delivery request is determined not to have the individual identification information (NO in step S1001), the processing proceeds to step S1004.

In step S1002, to prevent the duplicated delivery of the replacement for the same consumable, the delivery status determination unit 1403 checks whether the replacement has already been delivered for the consumable having been subjected to the delivery request. The consumable management server 200 maintains the recording table of the delivery status for each piece of individual identification information for the consumable in the hard disk 204 to manage the delivery status of the replacement. The recording table records whether the delivery processing has been performed as the delivery status for each piece of individual identification information for the consumable. In this step, the delivery status determination unit 1403 searches for the individual identification information for the consumable having been subjected to the delivery request in the recording table to determine whether the consumable has already been delivered. When the consumable has not been delivered (NO in step S1002), the processing proceeds to step S1003. On the other hand, when the consumable has already been delivered (YES in step S1002), the processing exits the flowchart.

In step S1003, in performing the processing for delivering the replacement for the consumable, the recording table updating unit 1404 updates the delivery status in the recording table from "Not Delivered" to "Delivered". Subsequently, in step S1004, the shipment processing execution unit 1405 performs the consumable delivery processing for delivering the replacement for the consumable to the user. In the consumable delivery processing, the consumable management server 200 may directly issue a delivery order, or access a delivery service provision system to request the system for the delivery processing.

In the present exemplary embodiment, instead of the consumable management server 200, the printer 100 can determine the consumable delivery. Similar to the first exemplary embodiment, even for a consumable not having the individual identification information, the printer 100 determines whether the consumable delivery is required based not on the remaining amount and the used amount of each consumable but on the lifetime cumulative consumption amount of the printer 100 through the processing from step S904 and subsequent steps. The consumable management server 200 enables prevention of the duplicated delivery by managing the delivery status for each piece of individual identification information for the printer. The configuration according to the present exemplary embodiment also enables suitable management of the delivery of the consumable not having the individual identification information.

A third exemplary embodiment will be described below. Components having been described above with reference to the first and the second exemplary embodiments will be assigned the same reference numerals, and redundant descriptions thereof will be omitted. The first and the second exemplary embodiments have been described using an example where the delivery target consumables are the ink cartridge and the waste ink tank. In the third exemplary embodiment, an embodiment will be described where the delivery target consumable is the paper cassette unit 112 for storing a recording medium such as printing paper.

With regard to the processing for updating the consumable information (corresponding to step S403 in FIG. 4) according to the present exemplary embodiment, an example will be described where the consumable is the paper cassette unit 112 with reference to the flowchart in FIG. 11. In step S1101, instead of the ink consumption acquisition unit 1301, a paper consumption acquisition unit (not illustrated) acquires a paper consumption amount (supplied and discharged) when paper is used as a recording medium in the print processing. In step S1102, instead of the remaining ink amount updating unit 1302, a remaining paper amount updating unit (not illustrated) reduces information about a remaining paper amount recorded in the NVM 104 in the printer 100 to update the information based on the paper consumption amount acquired in step S1101. The remaining paper amount may be directly acquired by use of a sensor for detecting the remaining paper amount on the paper cassette unit 112.

In step S1103, instead of the cumulative ink consumption updating unit 1303, a cumulative paper consumption updating unit (not illustrated) adds the paper consumption amount acquired in step S1101 to a lifetime cumulative paper consumption amount recorded in the NVM 104 in the printer 100 to update the lifetime cumulative paper consumption amount. The information about the remaining paper amount updated in step S1102 is reset when the paper cassette unit 112 is replaced, whereas the lifetime cumulative paper consumption amount updated in step S1103 is not reset when the paper cassette unit 112 is replaced but kept being added as a cumulative value of the printer 100.

A configuration of the consumable information used when the printer 100 transmits the consumable information to the consumable management server 200 (corresponding to step S404 in FIG. 4) according to the present exemplary embodiment will be described with reference to FIGS. 12A and 12B. In the present exemplary embodiment, the consumable information to be transmitted to the consumable management server 200 has a different configuration between a case where the delivery target consumable has the individual identification information and a case where the delivery target consumable does not have the individual identification information. FIG. 12A illustrates the consumable information in a case where the paper cassette unit 112, which stores the printing paper and is subjected to the consumable delivery, has the individual identification information. FIG. 12B illustrates the consumable information in a case where the paper cassette unit 112 does not have the individual identification information.

When the delivery target paper cassette unit 112 has the individual identification information, the consumable information transmitted to the consumable management server 200 includes the individual identification information for the printer 100, and the individual identification information and the remaining paper amount for each paper cassette unit 112, as illustrated in FIG. 12A. On the other hand, when the delivery target consumable does not have the individual identification information, the consumable information transmitted to the consumable management server 200 includes the individual identification information for the printer 100, and the lifetime cumulative paper consumption amount for each paper cassette unit 112, as illustrated in FIG. 12B. As described above, the remaining paper amount and the lifetime cumulative paper consumption amount also included in the consumable information are managed by the processing for updating the consumable information illustrated in FIG. 11.

The processing for determining the consumable delivery (corresponding to step S405 in FIG. 4) according to the present exemplary embodiment is similar to the processing described with reference to the flowchart illustrated in FIG. 7 according to the first exemplary embodiment. In the present exemplary embodiment, the delivery target consumable is the paper cassette unit 112. In the example in FIG. 12A, the remaining amount of the consumable in step S702 in FIG. 7 is equivalent to the information about the remaining paper amount of the paper cassette unit 112. In the example in FIG. 12B, the lifetime cumulative consumption amount in step S707 is equivalent to the lifetime cumulative paper consumption amount of the paper cassette unit 112.

As described above, in the present exemplary embodiment, even when the delivery target consumable is the paper cassette unit 112 not having the individual identification information, the duplicated delivery can be prevented and the suitable delivery management can be performed.

While, in each of the above-described exemplary embodiments, a printing apparatus is used as an example of a processing apparatus, application of the present disclosure is not limited to printing apparatuses. The present disclosure is widely applicable to processing apparatuses using consumables. While, in the above-described exemplary embodiments, an example is described where an automatic consumable delivery service is provided, the present disclosure is not limited thereto but widely applicable to failure analysis and an accounting system as long as a service related to consumables is provided.

The present disclosure can also be embodied when a program for implementing at least one of the functions according to the above-described exemplary embodiments is supplied to a system or an apparatus via a network or a storage medium, and at least one processor in a computer of the system or the apparatus reads and executes the program. Further, the present disclosure can also be embodied by a circuit, such as an Application Specific Integrated Circuit (ASIC), for implementing at least one function. For example, the components of the above-described exemplary embodiments may be implemented by use of a controller unit (ASIC) of the printer unit 109. In this case, the printer unit 109 manages ink information such as the remaining ink amount information for the ink tank unit 110, the status information indicating the remaining capacity of the waste ink tank unit 111, and the paper information such as the remaining paper amount of the paper cassette unit 112.

Recording these pieces of information in the NVM 104 via the printer unit 109 enables continuous management of the information even after power is turned off. Nonvolatile memories may be attached to the ink tank unit 110, the waste ink tank unit 111, and the paper cassette unit 112, and these pieces of information may be recorded and managed in the nonvolatile memories attached to these units instead of the NVM 104.

The present exemplary embodiment makes it possible to provide a suitable service to consumables not having the individual identification information.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-113307, filed Jul. 14, 2022, which is hereby incorporated by reference herein in its entirety.

What is claimed is:

1. A processing system comprising:
a processing apparatus configured to perform processing by using consumables; and
a server system configured to manage a service related to the consumables,
wherein the processing apparatus includes:
an acquisition unit configured to acquire first information about a consumption amount of a currently used consumable;
a first updating unit configured to, based on the acquired first information, update second information about a cumulative consumption amount of the consumable used by the processing apparatus stored in a first storage unit; and
a transmission unit configured to transmit the updated second information to the server system, and
wherein the server system includes:
a reception unit configured to receive the second information from the processing apparatus; and
a first determination unit configured to determine whether to provide a service based on the second information received by the reception unit and the second information previously received from the processing apparatus which is stored in a second storage unit,
wherein, in a case where the consumable does not have individual identification information, the transmission unit transmits the second information and identification information for the processing apparatus, and
wherein, in a case where the consumable has the individual identification information, the transmission unit transmits the first information and individual identification information for the consumable.

2. The processing system according to claim 1, wherein the server system further comprises a second updating unit configured to update the second information stored in the second storage unit based on the second information received by the reception unit and the second information previously received from the processing apparatus which is stored in the second storage unit.

3. The processing system according to claim 1, wherein the first determination unit determines whether to provide a service based on a difference between the second information received by the reception unit and the second information previously received from the processing apparatus which is stored in the second storage unit.

4. The processing system according to claim 1, wherein the server system further includes a second determination unit configured to determine whether the received information from the processing apparatus includes the individual identification information for the consumable.

5. The processing system according to claim 4, wherein, when the second determination unit determines that the received information from the processing apparatus does not include the individual identification information for the consumable, the first determination unit determines whether to provide the service based on the received first information.

6. The processing system according to claim 1, further comprising a recording unit configured to, when the first determination unit determines to provide the service, record information resulting from provision of the service.

7. The processing system according to claim 1, wherein, when the first determination unit determines to provide the service, the server system instructs another server to provide the service.

8. The processing system according to claim 1, wherein the service includes delivery of a replacement for the consumable to a user.

9. The processing system according to claim 1, wherein the consumable is ink, and the processing apparatus is a printing apparatus that performs printing on a recording medium by using ink.

10. The processing system according to claim 1, wherein the consumable is a waste ink tank, and the processing apparatus is a printing apparatus that performs printing on a recording medium by using ink.

11. The processing system according to claim 1, wherein the consumable is a recording medium, and the processing apparatus is a printing apparatus that performs printing on the recording medium.

12. A processing system comprising:
a processing apparatus configured to perform processing by using consumables; and
a server system configured to manage a service related to the consumables,
wherein the processing apparatus includes:
an acquisition unit configured to acquire first information about a consumption amount of a currently used consumable;
an updating unit configured to, based on the acquired first information, update second information about a cumulative consumption amount of the consumable used by the processing apparatus stored in a first storage unit;
a determination unit configured to determine whether to request for provision of a service based on the second information before being updated by the updating unit and the second information after being updated by the updating unit; and
a transmission unit configured to, when the determination unit determines to request for the provision of the service, transmit information for requesting for the provision of the service to the server system, and
wherein the server system includes a reception unit configured to receive the information for requesting for the provision of the service from the processing apparatus.

13. A processing method in a processing system including a processing apparatus configured to perform processing by using consumables, and a server system configured to manage a service related to the consumables, the method comprising:
acquiring, via the processing apparatus, first information about a consumption amount of a currently used consumable;
updating, via the processing apparatus, second information about a cumulative consumption amount of the consumable used by the processing apparatus stored in a first storage unit, based on the acquired first information;
transmitting, via the processing apparatus, the updated second information to the server system;
receiving, via the server system, the second information from the processing apparatus; and
determining, via the server system, whether to provide a service based on the received second information and the second information previously received from the processing apparatus which is stored in a second storage unit,
wherein, in a case where the consumable does not have individual identification information, the transmission unit transmits the second information and identification information for the processing apparatus, and
wherein, in a case where the consumable has the individual identification information, the transmission unit transmits the first information and individual identification information for the consumable.

14. A processing method in a processing system including a processing apparatus configured to perform processing by using consumables, and a server system configured to manage a service related to the consumables, the method comprising:
acquiring, via the processing apparatus, first information about a consumption amount of a currently used consumable;
updating, via the processing apparatus, second information about a cumulative consumption amount of the consumable used by the processing apparatus stored in a first storage unit, based on the acquired first information;
determining, via the processing apparatus, whether to request for provision of a service based on the second information before being updated and the second information after being updated;
transmitting, via the processing apparatus, when the provision of the service is determined to be requested, information for requesting for the provision of the service to the server system; and
receiving, via the server system, the information for requesting for the provision of the service from the processing apparatus.

* * * * *